J. W. LYTTON.
STEAM TRAP.
APPLICATION FILED DEC. 20, 1909.
983,381.
Patented Feb. 7, 1911.
Fig. 1
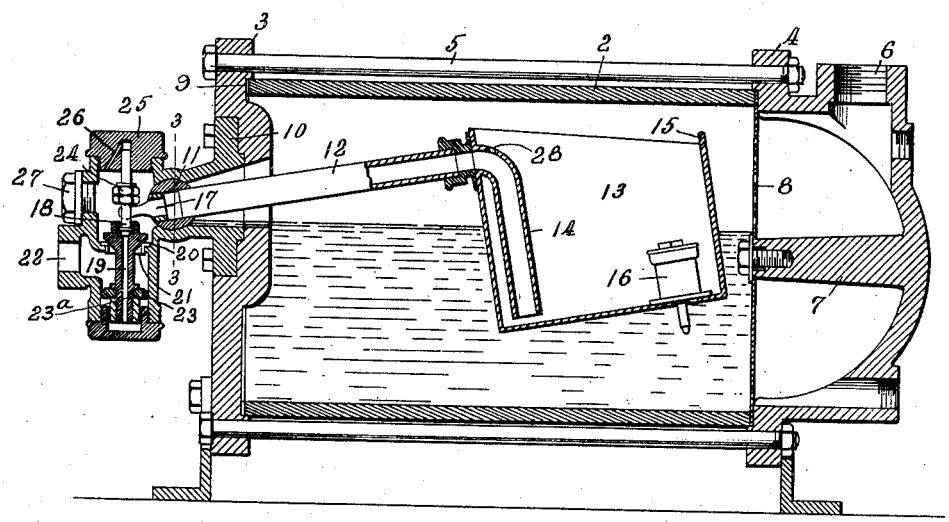
Fig. 2
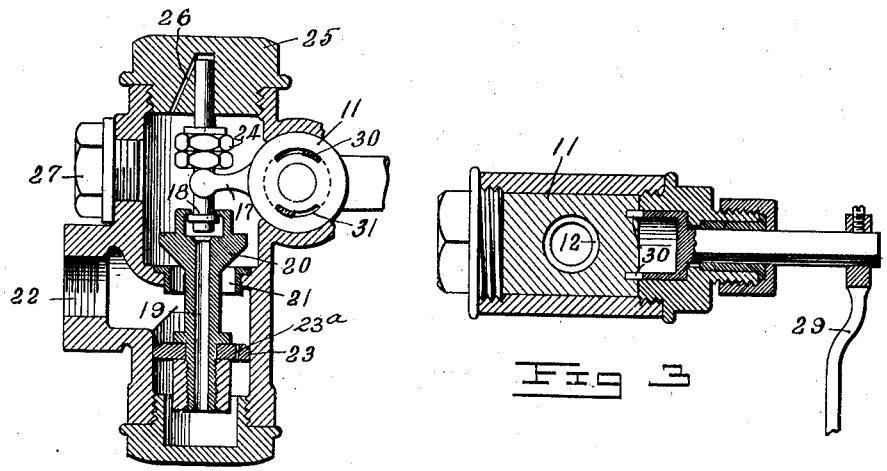
Fig. 3
Witnesses
H. A. Robinette
Inventor
Jarard W. Lytton
By Eugene Cushman Rea
Attorney

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

STEAM-TRAP.

983,381.     Specification of Letters Patent.     Patented Feb. 7, 1911.

Application filed December 20, 1909. Serial No. 534,222.

*To all whom it may concern:*

Be it known that I, JARARD W. LYTTON, a citizen of the United States, residing at Franklin, in the county of Southampton and State of Virginia, have invented new and useful Improvements in Steam-Traps, of which the following is a specification.

The present invention relates to steam traps, and in the drawings which accompany this specification and form a part of my disclosure, I have illustrated one embodiment of my invention.

In the drawings:—Figure 1 is a sectional view of a steam trap constructed in accordance with my invention. Fig. 2 is an enlarged sectional view of the valve mechanism and valve casing shown in Fig. 1. Fig. 3 is a sectional view on line 3—3 of Fig. 1.

Referring to the drawings by reference characters, the same characters indicating like parts in the several views 2 denotes the trap body preferably formed of a cylindrical section of wrought iron or steel pipe and provided with heads 3, 4, which are fitted with a close joint to the ends of the trap body 2, and are then tied together by a series of longitudinally arranged tie bolts or rods 5, all as shown and described in my Patent No. 788,485, dated April 25, 1905. The head 4 is provided with the inlet 6, which connects it to the system to be drained, and preferably this head has also a lug 7 placed centrally thereof and adapted to hold a strainer plate 8, which preferably is of copper, and of such diameter as to fit the seat in the head 4 which receives the section 2 and form a gasket between the head and seat so as to give a tight joint, this strainer plate 8 being provided on its upper half with a series of perforations so as to permit free ingress of steam and water from the inlet 6. At the bottom of the head 4 is an opening to drain and clean out all sediment which may collect behind the strainer plate 8. This opening will be closed by a plug or cock when the trap is in use. A gasket 9 of copper or other suitable material is provided at the opposite end of the trap body 2 so as to give a close joint with the head 3. The said head 3 is provided on its outer surface with a seat to receive a fitting 10 for the valve mechanism, such fitting 10 being secured in any suitable manner to the head 3, and preferably said head will be thickened at this point as shown in Fig. 1, in order to give sufficient metal for the seat in its outer face. The said fitting 10 is provided with a trunnion seat in which is mounted a trunnion 11, which has connected therewith a float stem 12 which projects inwardly into the trap 2 and carries the float member.

The float member 13, as shown, is an open topped receptacle within which, and as a continuation of the float stem 12, is a pipe 14 projecting close to the bottom of the float 13 as shown, so that there is a passage from the bottom of the float 13 through the pipe 14, float stem 12, and through the trunnion 11 to the valve casing, presently to be described. The float 13 is preferably provided with a buffer projection 15 at its top, and in order to prevent hammering and take care of any undue shock to the float and its connected parts when it falls I provide the dash pot 16, the stem of which projects through and below the bottom of the float 13 so that as the float falls in the operation of the trap the shock of striking the bottom of the trap 2 will be taken up by the dash pot.

Projecting forwardly from the trunnion 11 is a valve operating fork 17 which embraces the stem of a preliminary valve 18 which normally closes a passage 19 traversing the main valve 20 which controls the port 21 of the trap outlet 22, as shown, said valve 20 being provided at its lower end with a piston 23, the area of which is greater than the area of the valve 20. The preliminary valve 18 carries adjustable nuts 24, which are engaged by the fork 17 and to guide the movements of said valve 18 its stem plays in a cap nut 25 in the valve casing, a suitable pressure equalizing passage 26 being provided in the cap nut and leading to the top of the stem of the valve 18.

In order that the valve parts and particularly the preliminary valve 18 may be readily accessible, I preferably provide in the front of the valve casing an opening which is closed by a plug nut 27. A small hole 23ᵃ is bored through the piston 23 to permit the escape of water from below said piston when the preliminary valve 18 is closed so that the main valve can seat promptly.

With this construction it will be seen that pressure from the steam entering through the inlet 6 will fill the trap and valve casing, such pressure passing to the valve casing readily through the pipe 14, float stem 12, trunnion 11, and fork 17, and standing above the valve 20, hold it to its seat 21 so as to close the outlet 22. As the trap 2 fills with the water of condensation the float 13 will rise until it reaches the limit of its upward movement, and then the gradually rising water in the trap will overflow and fill the float 13 until it falls to the bottom, whereupon the fork 17 will lift the preliminary valve 18, at once throwing pressure into the passage 19 beneath the piston 23 of the valve 20, which will then be lifted from its seat and the liquid contents of the float 13 will be forced out through pipe 14, float stem 12, trunnion 11, and fork 17, through the port 21 to the outlet 22, whereupon the float 13 relieved of its liquid contents will at once rise, allowing preliminary valve 18 to close, whereupon the pressure above the valve 20 will close the port 21, and this operation will be repeated as long as the trap fills with water from the system.

It will be understood, of course, that the trap 2 normally contains a sufficient amount of water to maintain the float 13 in approximately the position shown in Fig. 1, with the fork 17 in such position that the preliminary valve 18 will be closed, and the adjustable nuts 24 provide for a sufficient regulation of the valve 18 and the operating forks 17 as to secure the proper relation of the parts.

In order that there may be no danger of a siphonic action being set up through the pipe 14 and float stem 12 by reason of the trap filling to the point where water would work past trunnion 11 into the valve casing and back through the stem 12 and pipe 14, which upon being filled would siphon out into the valve casing and interfere with the operation of the trap I make a small aperture 28 in the angle of the pipe 14, which is sufficient to break any siphon, but does not interfere with the ejection of the water through pipe 14 and float stem 12 under pressure, the aperture being so small that while amply sufficient to break any siphonic action no material amount of water will escape during the emptying of the float.

It is sometimes desirable to manipulate the float by hand, and to this end I provide trunnion 11 with a handle 29 projecting outside the casing, as shown in Fig. 3, this operating handle 29 being provided with projecting fingers 30, which enter arc-shaped grooves 31 in the trunnion 11 as shown in Figs. 2 and 3, so that while the trunnion may be rocked through the medium of this handle 29, and the finger and groove connection, yet the trunnion may rock under the influence of the float 13 without operating the handle, and this enables me to make a very tight joint about the handle spindle where it projects from the casing without imposing so much frictional resistance upon the trunnion 11 as to hamper or check its rocking movements in its seat, thus making the mechanism for operating the valves and emptying the trap exceedingly easy to operate, and consequently more efficient and certain.

I claim:

1. A steam trap having, in combination, a body-portion, an inlet head fitted thereto, a screen supporting lug projecting from said head and integral therewith, and a screen or baffle-plate the lower half of which is imperforate carried by said lug.

2. A steam trap having, in combination, a body-portion, detachable inlet and outlet heads therefor, the outlet head having a depression in its outer face, tie rods clamping said heads and body-portion, together, and an outlet-valve casing having a trunnion seat and an integral supporting plate countersunk in said depression.

3. In a steam trap and in combination, a trap-body having inlet and outlet, a valve casing and valve mechanism therein for controlling the outlet comprising a piston-valve normally closed by steam pressure, a preliminary valve controlling opening pressure for said piston valve, and means pivoted in said valve casing and controlled by the water in the trap-body to open said preliminary valve, said means forming the passageway through which the water escapes from said trap body.

4. In a steam trap and in combination, a trap body having inlet and outlet, a valve casing and valve mechanism therein for controlling the outlet, said mechanism comprising a normally-closed pressure-operated valve, a preliminary valve for controlling opening pressure to said outlet valve, a hollow float in said trap body, and a tubular float stem pivoted in said valve casing and adapted to control the movement of the preliminary valves, said tubular float stem serving as a passage for withdrawing the water from the trap body.

5. In a steam trap and in combination, a trap body having inlet and outlet, a pressure-controlled outlet valve, and a valve casing therefor, a float, and a float operated preliminary valve adapted to control pressure to said outlet valve, and a tubular float stem pivoted in said valve chamber through which the water in said trap body is withdrawn by the outlet when the outlet valve is open.

6. In a steam-trap and in combination, a trap-body having inlet and outlet, a valve casing in direct communication with said outlet, a piston valve in said casing controlling said outlet and having a pressure passage therein from a pressure source to a piston chamber, a float and a tubular float stem, and a float-controlled preliminary valve carried by said outlet valve and controlling said pressure passage, said float stem passing through said outlet to the preliminary valve.

7. In a steam-trap and in combination, a trap-body having inlet and outlet, a valve casing at the outlet provided with removable end caps, a preliminary valve and a piston valve in the casing, one of said caps having a perforation therein to serve as a guide for the stem of the preliminary valve, and the other cap formed with a chamber adapted to receive the lower end of the piston valve.

8. In a steam-trap, the combination with a trap-body having inlet and outlet, of an outlet valve, a valve-operating arm, a trunnion for said arm, and manually operating means comprising a rocking member adapted to engage said trunnion in a manner to permit lost motion between the parts.

9. In a steam-trap, the combination with a trap-body having inlet and outlet, of an outlet valve, valve-operating means including a trunnion in a closed trunnion chamber, and a trunnion-operating handle projecting through a stuffing in said chamber and having a lost motion connection with said trunnion.

10. In a steam-trap, the combination with a trap-body having inlet and outlet, of an outlet valve, a valve casing, a trunnion chamber in said casing, a valve-engaging arm extending from said trunnion into the valve chamber, a float, a float-carrying arm extending from said trunnion within the trap-body, and a trunnion-operating arm projecting from said trunnion chamber and having a lost motion connection with said trunnion.

11. In a steam-trap, the combination with a trap-body having inlet and outlet, of a valve casing, an outlet valve therein, a valve operating arm, a trunnion mounted in said casing, and having a transverse passage, a hollow valve-engaging fork projecting from said passage, on one side of said trunnion, a float, and a hollow float carrying arm projecting from said passage on the other side of said trunnion.

12. In a steam trap, the combination with a trap-body having inlet and outlet, of an outlet valve, a valve operating float, a hollow arm forming a drainage leg connecting said valve and float, said arm having an aperture between its ends.

13. In a steam trap, the combination with a trap-body having inlet and outlet, of an outlet valve, a float for operating said valve, and an arm connecting said valve and float and extending close to the bottom of said float, said arm having an aperture at its highest point to prevent siphonic action in said arm.

14. In a steam trap, the combination with a trap-body having inlet and outlet, an outlet valve, a bucket float, and a pivoted angular drainage arm connecting said valve and float, said drainage arm having a slight perforation to prevent siphoning.

In testimony whereof I have hereunto set my hand in presence of two subscribing witnesses.

JARARD W. LYTTON.

Witnesses:
F. X. SCHULLER,
W. W. VAUGHAN, Jr.